(12) United States Patent
DiTomaso et al.

(10) Patent No.: US 12,288,075 B1
(45) Date of Patent: Apr. 29, 2025

(54) INSTRUCTION EXECUTION SCHEDULING USING A HIT/MISS PREDICTOR

(71) Applicant: INTERNATIONAL BUSINESS MACHINES CORPORATION, Armonk, NY (US)

(72) Inventors: Dominic DiTomaso, Hyde Park, NY (US); David Trilla Rodriguez, New York, NY (US); Alper Buyuktosunoglu, White Plains, NY (US); Craig R Walters, Highland, NY (US); Ram Sai Manoj Bamdhamravuri, Boston, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/585,240

(22) Filed: Feb. 23, 2024

(51) Int. Cl.
*G06F 12/00* (2006.01)
*G06F 9/38* (2018.01)
*G06F 12/0875* (2016.01)

(52) U.S. Cl.
CPC ........ *G06F 9/3861* (2013.01); *G06F 12/0875* (2013.01); *G06F 2212/452* (2013.01)

(58) Field of Classification Search
CPC ............... G06F 9/3861; G06F 12/0875; G06F 2212/452
See application file for complete search history.

(56) References Cited

U.S. PATENT DOCUMENTS

| | | |
|---|---|---|
| 10,007,523 B2 | 6/2018 | Srinivasan et al. |
| 10,127,044 B2 | 11/2018 | Williams et al. |
| 10,503,538 B2 | 12/2019 | Gschwind et al. |
| 10,719,441 B1 | 7/2020 | Yin et al. |
| 10,936,319 B2 | 3/2021 | Srinivasan et al. |
| 11,080,062 B2 | 8/2021 | Pota et al. |
| 11,709,679 B2 | 7/2023 | Al Sheikh et al. |
| 11,829,764 B2 | 11/2023 | Pota et al. |

(Continued)

FOREIGN PATENT DOCUMENTS

| | | | | | |
|---|---|---|---|---|---|
| CN | 109313555 A | * | 2/2019 | .......... | G06F 12/0811 |
| CN | 118043771 A | * | 5/2024 | .......... | G06F 12/0238 |

OTHER PUBLICATIONS

Anonymous, "Method for Pipelining Line Predictor," IP.com No. IPCOM000018664D, Jul. 30, 2003, pp. 1-7 (including cover sheet).

(Continued)

*Primary Examiner* — Tim T Vo
*Assistant Examiner* — Mohammad S Hasan
(74) *Attorney, Agent, or Firm* — Edward J. Wixted, III; Blanche E. Schiller, Esq.; Heslin Rothenberg Farley & Mesiti P.C.

(57) ABSTRACT

A cache hit-miss prediction is determined for a memory access instruction using a predictor. The predictor includes a tracker for the memory access instruction. The tracker is used to provide a prediction confidence level of the cache hit-miss prediction for the memory access instruction. Using the tracker, the prediction confidence level of the cache hit-miss prediction is ascertained. Based on the prediction confidence level indicating the cache hit-miss prediction is to be used, the cache hit-miss prediction is provided to be used in instruction execution scheduling.

20 Claims, 8 Drawing Sheets

(56) References Cited

U.S. PATENT DOCUMENTS

| | | | | |
|---|---|---|---|---|
| 2006/0174090 | A1* | 8/2006 | Sartorius | G06F 9/3844 712/E9.056 |
| 2007/0143580 | A1* | 6/2007 | Musoll | G06F 9/383 712/205 |
| 2017/0277636 | A1* | 9/2017 | Lee | G06F 12/0895 |
| 2019/0163639 | A1* | 5/2019 | Wu | G06F 12/0895 |
| 2022/0067156 | A1* | 3/2022 | Favor | G06F 21/75 |
| 2024/0061780 | A1* | 2/2024 | Duan | G06F 11/3037 |

OTHER PUBLICATIONS

Anonymous, "Value Prediction Implementation," IP.com No. IPCOM0000263479D, Sep. 3, 2020, pp. 1-5 (including cover sheet).

Anonymous, "Most Frequent Miss Interval Instruction Prefetcher," IP.com No. IPCOM000266711D, Aug. 12, 2021, pp. 1-2 (including cover sheet).

Yoaz, Adi et al., "Speculation Techniques for Improving Load Related Instruction Scheduling," Proceedings of the 26th International Symposium on Computer Architecture, Aug. 2002, pp. 1-12.

Peir, Jih-Kwon et al., "Bloom Filtering Cache Misses for Accurate Data Speculation and Prefetching," ICS '02: Proceedings of the 16th international conference on Supercomputing, Jun. 2002, pp. 189-198.

Bennett, James E. et al., "Reducing Cache Miss Rates Using Prediction Caches," Computer Systems Laboratory, Stanford University, Technical Report No. CSL-TR_96-707, Oct. 1996, pp. 1-26.

CSE 471—Advanced Caching Techniques, Spring 2014 (no further date information available) pp. 1-9.

Jalili, Majid et al., "Reducing Load Latency with Cache Level Prediction," University of Texas at Austin, Mar. 2021, pp. 1-12.

Tyson, Gary et al., "A Modified Approach to Data Cache Management," Proceedings of the 28th Annual International Symposium on Microarchitecture, Nov. 1995, pp. 93-103.

Lee, Jongmin et al., "Filter Data Cache: An Energy-Efficient Small L0 Data Cache Architecture Driven by Miss Cost Reduction," IEEE Transactions on Computers, vol. 64, No. 7, Jul. 2015, pp. 1927-1939.

Qureshi, Moinuddin et al., "Fundamental Latency Trade-offs in Architecting DRAM Caches," 2012 IEEE/ACM 45th Annual International Symposium on Microarchitecture, Dec. 2012, pp. 235-246.

Anonymous, "Avoiding Deadlocks in a Multi-Processor Environment with a First Level Cache Using a Logical Directory," IP.com No. IPCOM000271077D, Oct. 12, 2022, 5 pages (including cover).

Wu, Carole-Jean et al., "SHiP: Signature-based Hit Predictor for High Performance Caching," MICRO-44: Proceedings of the 44th Annual IEEE/ACM International Symposium on Microarchitecture, Dec. 2011, pp. 430-441.

Tullen, Dean, "Improving Cache Performance—Reducing Misses," 2020 (no further date information), 9 pages.

Xiao, Jun et al., "Floria: A Fast and Featherlight Approach for Predicting Cache Performance," ICS '23: Proceedings of the 37th International Conference on Supercomputing, Jun. 2023, pp. 25-36.

Sim, Jaewoong et al., "A Mostly-Clean DRAM Cache for Effective Hit Speculation and Self-Balancing Dispatch," MICRO-45: Proceedings of the 2012 45th Annual IEEE/ACM International Symposium on Microarchitecture, Dec. 2012, pp. 247-257.

Anonymous, "Dynamic Cache Reservation for Virtual Machine Applications in Cloud," IP.com No. IPCOM000233167D, Nov. 28, 2013, pp. 1-6 (+ cover).

Lu, Xiaoyang et al., "CARE: A Concurrency-Aware Enhanced Lightweight Cache Management Framework," Illinois Tech, 2022 (no further date information available), 30 pages.

Anonymous, "Method and Apparatus for Dynamic Cache Bypass and Insertion," IP.com No. IPCOM000223644D, Nov. 20, 2012, pp. 1-6 (+ cover).

* cited by examiner

INSTRUCTION EXECUTION SCHEDULING USING A HIT/MISS PREDICTOR

BACKGROUND

One or more aspects relate, in general, to processing within a computing environment, and in particular, to instruction execution scheduling within the computing environment.

Certain instructions, such as load and store instructions, move data from/to memory. For instance, a load instruction moves data from memory to a register, and a store instruction moves data from a register to memory. To improve processing speed in moving the data and/or in accessing the data, cache memory is employed. For instance, a load instruction attempts to access the data to be moved in a cache memory and if it is not available in the cache memory (a cache miss), then it accesses the data in memory.

Existing industry processor/cache designs commonly speculate and optimize around the presumption that the actions in their pipelines will observe a cache hit during common operations. That is, the data to be accessed is in the cache. While this benefits the cache hit scenario, it introduces negative side effects in the cache miss scenario.

SUMMARY

Shortcomings of the prior art are overcome, and additional advantages are provided through the provision of a computer-implemented method. The computer-implemented method includes determining a cache hit-miss prediction for a memory access instruction using a predictor. The predictor includes a tracker for the memory access instruction. The tracker is used to provide a prediction confidence level of the cache hit-miss prediction for the memory access instruction. Using the tracker, the prediction confidence level of the cache hit-miss prediction is ascertained. Based on the prediction confidence level indicating the cache hit-miss prediction is to be used, the cache hit-miss prediction is provided to be used in instruction execution scheduling.

Computer-implemented methods, computer systems and computer program products relating to one or more aspects are described and claimed herein. Each of the embodiments of the computer-implemented method may be embodiments of each computer system and/or computer program product and vice-versa. Further, each of the embodiments is separable and optional from one another. Moreover, embodiments may be combined with one another. Each of the embodiments of the computer-implemented method may be combinable with aspects and/or embodiments of each computer system and/or computer program product, and vice-versa. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
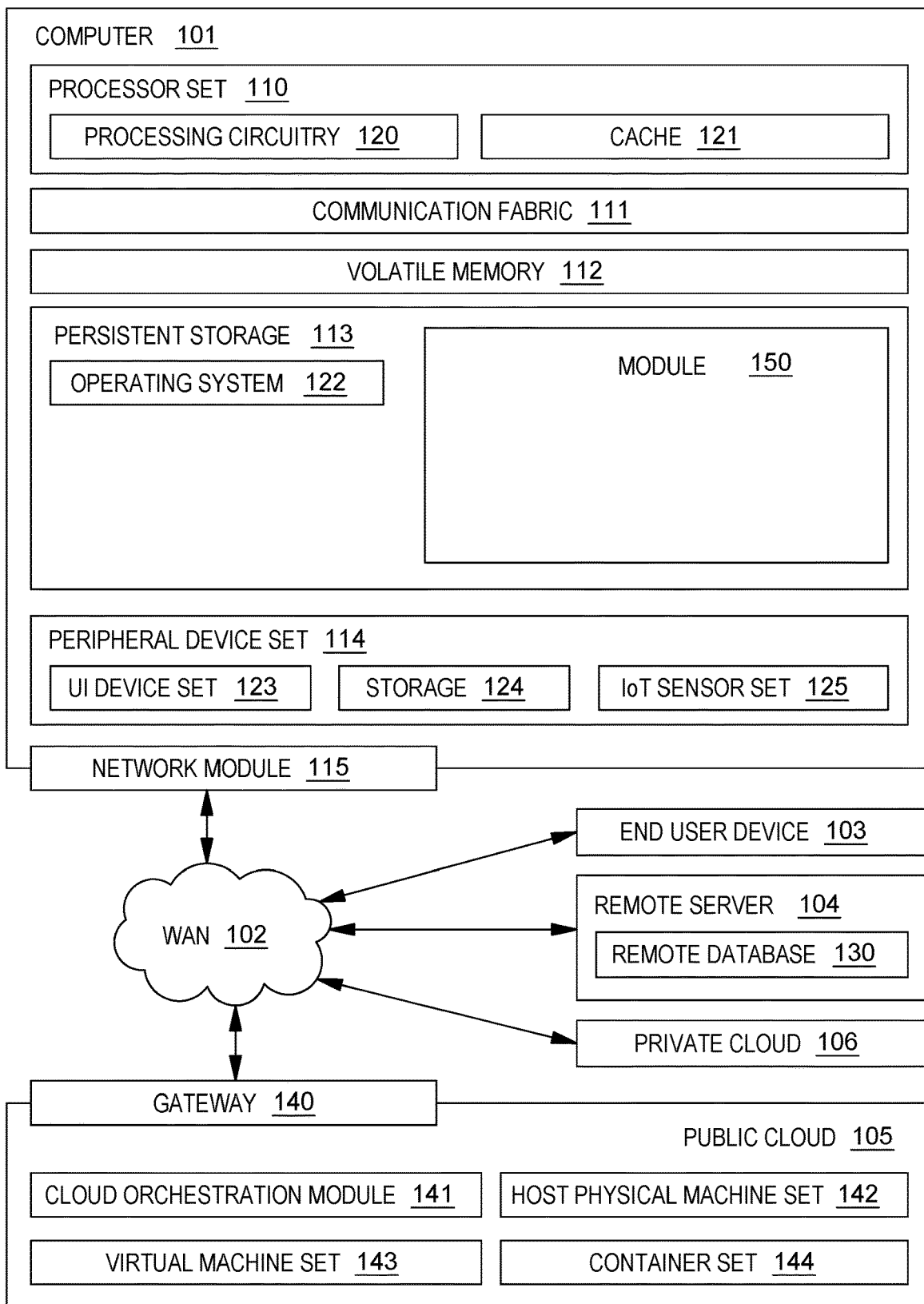
FIG. 1 depicts one example of a computing environment to incorporate and use one or more aspects of the present disclosure.

In accordance with one or more aspects of the present disclosure, a capability is provided to facilitate processing within a computing environment. In one or more aspects, the capability includes using a hit/miss predictor (also referred to herein as a predictor or a miss predictor) to predict whether a cache miss or hit is predicted for a memory access instruction (e.g., a load or a store instruction). Based on the cache hit-miss prediction (also referred to as a prediction herein), scheduling of memory access instructions and/or dependent instructions of memory access instructions is performed.

In one or more aspects, the hit/miss predictor uses a tracker to determine a confidence level of a prediction made using the hit/miss predictor (e.g., using a chosen counter of the hit/miss predictor). The confidence level is used to determine whether the prediction is to be used in instruction execution scheduling. For instance, if a value of the tracker has a predefined relationship with a confidence threshold (e.g., greater than or equal), then the prediction is used; otherwise, the prediction is not used (e.g., ignored, unenabled, bypassed, etc.).

One or more aspects of the present disclosure are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) that performs, e.g., cache hit-miss prediction, instruction scheduling based on cache hit-miss predictions and/or one or more other aspects of the present disclosure. Aspects of the present disclosure are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code or logic involved in performing the inventive methods, such as module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods.

Communication fabric 111 is the signal conduction paths that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

In one example, block 150 may include instructions, such as memory access instructions and/or instructions dependent thereon to be scheduled. In one or more aspects, it may include additional, less and/or different code. Further, in one or more aspects, block 150 may not be used. Various examples are possible.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present disclosure. Other examples are possible. For instance, in one or more embodiments, one or more of the components/modules of FIG. 1 are not included in the computing environment and/or are not used for one or more aspects of the present disclosure. Further, in one or more embodiments, additional and/or other components/modules may be used. Other variations are possible.

Figure 2:
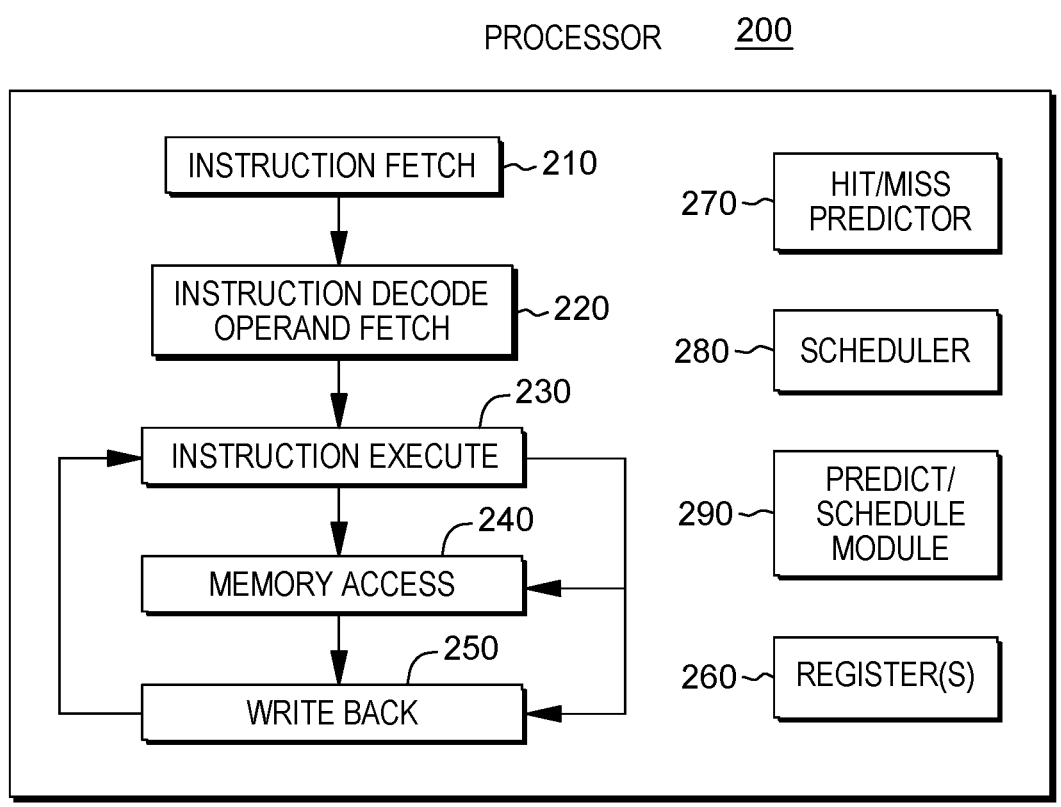
FIG. 2 depicts one example of further details of a processor of a processor set of FIG. 1, in accordance with one or more aspects of the present disclosure.

In one example, a processor (e.g., of processor set 110) includes a plurality of functional components (or a subset thereof and/or additional components) used to execute instructions. As depicted in FIG. 2, in one example, a processor 200 includes a plurality of functional components including, for instance, an instruction fetch component 210 to fetch instructions to be executed; an instruction decode/operand fetch component 220 to decode the fetched instructions and to obtain operands of the decoded instructions; one or more instruction execute components 230 to execute the decoded instructions; a memory access component 240 to access memory for instruction execution, if necessary; and a write back component 250 to provide the results of the executed instructions. One or more of the components may access and/or use one or more registers 260. Further, in accordance with one or more aspects, one or more of the components may be coupled to and/or use a hit/miss predictor 270, a scheduler 280 and/or a predict/schedule module 290. Additional, fewer and/or other components may be used in one or more aspects of the present disclosure.

Figure 3A:
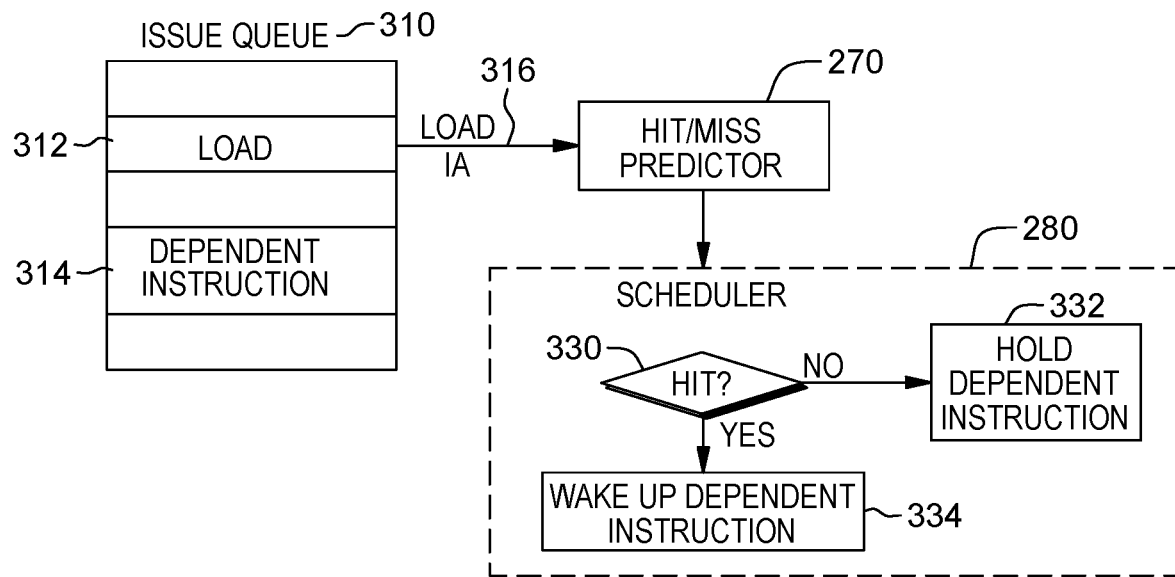
FIG. 3A depicts one example of using a hit/miss predictor in scheduling one or more dependent instructions of a memory access instruction (e.g., a load instruction), in accordance with one or more aspects of the present disclosure.

One example of using a hit/miss predictor (e.g., hit/miss predictor 270) and a scheduler (e.g., scheduler 280) is described with reference to FIG. 3A. In one example, hit/miss predictor 270 is coupled to an issue queue 310 of a processor (e.g., processor 200) that has stored therein one or more instructions, including one or more memory access instructions and instructions dependent thereon. As examples, a memory access instruction is a load instruction or a store instruction. In the depicted examples and for convenience in the description herein, the memory access instruction is a load instruction; however, this is only one example. The memory access instruction may be a store instruction and/or any other instruction that accesses memory.

As shown, in one example, issue queue 310 includes a load instruction 312 and a dependent instruction 314. The dependent instruction is dependent, for instance, on the load instruction. The issue queue may include additional, fewer and/or other instructions.

In one example, an instruction address (IA) 316 of the load instruction is input to hit/miss predictor 270, which determines whether the load instruction is predicted to hit or miss in a cache, such as a local cache (e.g., an L1 cache). The output of hit/miss predictor 270 is input into scheduler 280. Scheduler 280 determines 330 whether the output from hit/miss predictor 270 is a hit. If it is not a hit (i.e., it is a miss), scheduler 280 holds 332 instructions dependent on the selected load instruction, if any. Otherwise, if the output of hit/miss predictor 270 is a hit, then scheduler 280 wakes up 334 any dependent instructions of the selected load instruction. For instance, dependent instruction 314 is sent to an execution unit (e.g., instruction execute 230) of the processor (e.g., processor 200) for execution.

Figure 3B:
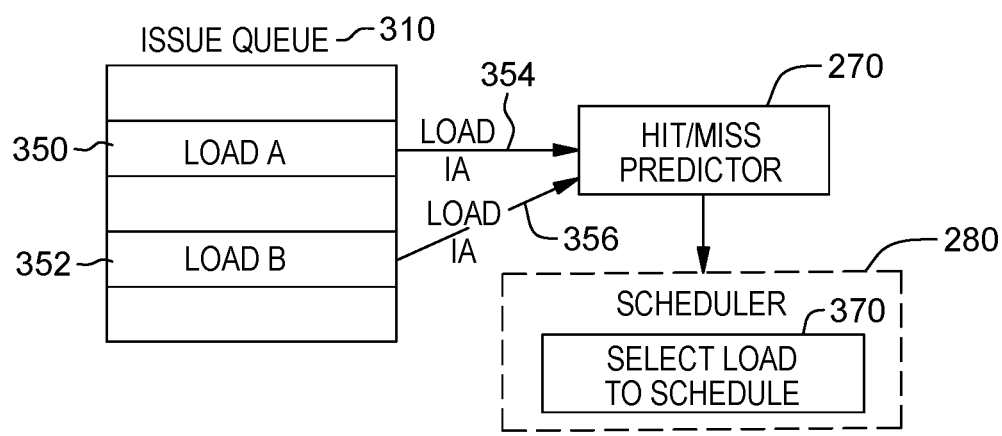
FIG. 3B depicts one example of using a hit/miss predictor in scheduling memory access instructions, in accordance with one or more aspects of the present disclosure.

Another example of using a hit/miss predictor (e.g., hit/miss predictor 270) and a scheduler (e.g., scheduler 280) is described with reference to FIG. 3B. In one example, hit/miss predictor 270 is coupled to issue queue 310 that has stored therein one or more instructions, including one or more load instructions. In one example, issue queue 310 includes a load instruction 350 and another load instruction 352. The issue queue may include additional, fewer and/or other instructions.

In one example, instruction addresses 354, 356 of selected load instructions (e.g., load instructions 350, 352) are input to hit/miss predictor 270, which determines whether the selected load instructions are predicted to hit or miss in a cache, such as a local cache (e.g., an L1 cache). The output of hit/miss predictor 270 is input into scheduler 280. Scheduler 280 selects 370 one of the load instructions (e.g., one of instructions 350, 352) to be executed. For instance, it selects one of the loads instructions predicted to miss, and that load instruction is sent to the execution unit (e.g., instruction execute 230) for execution.

Figure 4:
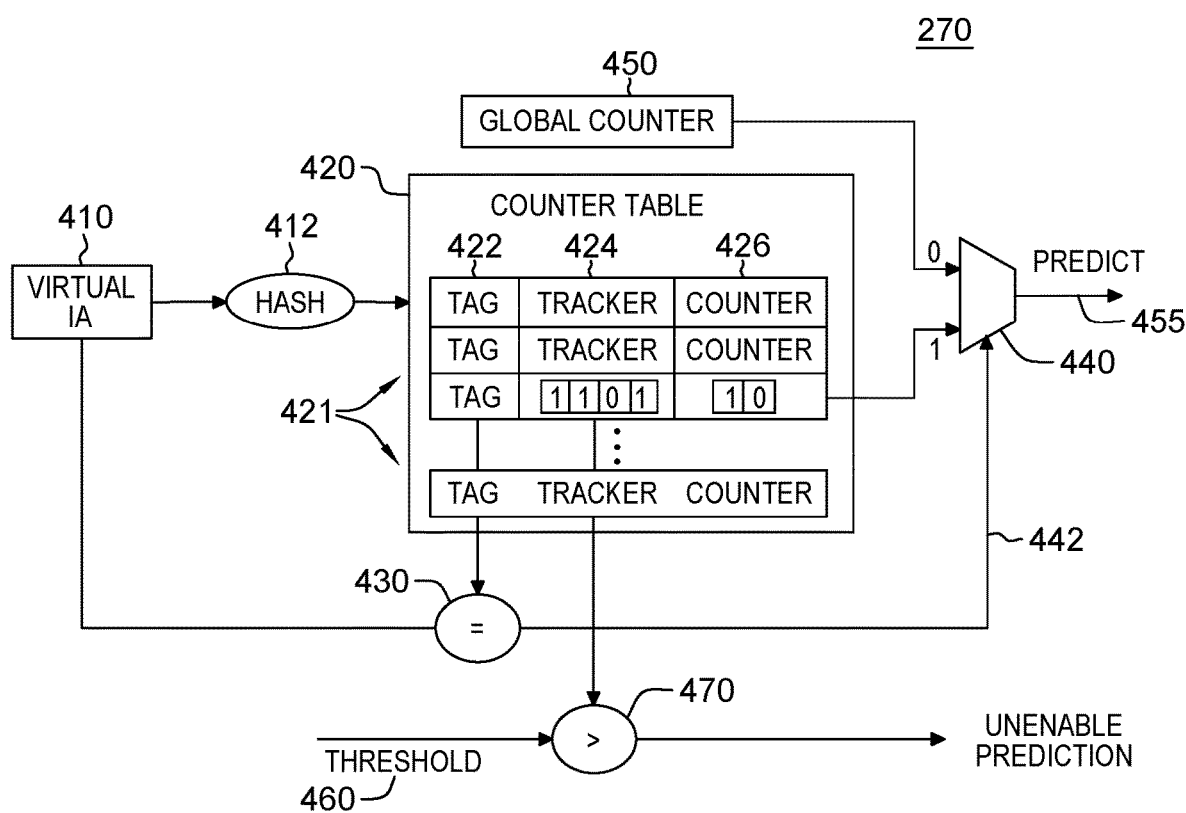
FIG. 4 depicts one example of details of a hit/miss predictor, in accordance with one or more aspects of the present disclosure.

Further details of a hit/miss predictor (e.g., hit/miss predictor 270) are described with reference to FIG. 4. In one example, hit/miss predictor 270 includes a counter table 420 (or other data structure), which is indexed by a hash 412 of an instruction address (e.g., virtual address 410 or other address) of a memory access instruction (e.g., load instruction 312, 350, 352, etc.) of an issue queue (e.g., issue queue 310). As an example, counter table 420 includes one or more entries 421, in which each entry 421 includes, for instance, a tag 422 that includes one or more bits of an instruction address, a tracker 424 to be used as a confidence indicator of the hit-miss prediction for the memory access instruction, and a counter 426 (e.g., an n-bit saturating counter) used to indicate a prediction. Example predictions include, for instance, a strong miss, a weak miss, a weak hit and a strong hit. Additional, different and/or other predictions may be determined. Moreover, selection of an entry may be performed by other techniques. Many examples are possible.

Further, in one example, predictor 270 includes a global counter 450 that is updated for each access of the predictor, as described herein. An output of global counter 450 and an output of counter 426 (also referred to as a local counter) are input to a multiplexer 440. Another input to multiplexer 440 is a select control 442, which selects between, for instance, the output of the local counter (e.g., counter 426) and the output of the global counter (e.g., counter 450). The selector is set based, for instance, on whether there is a match 430 between a tag of the virtual instruction address 410 (or other address) and tag 422 of a selected entry 421 of counter table 420. If there is a match, in one example, the value of the local counter (e.g., counter 426) is chosen; otherwise, the value of the global counter (e.g., global counter 450) is chosen.

In one example, the chosen value is used to determine a cache hit-miss prediction. For instance, the chosen value is compared to a hit-miss threshold. If the chosen value has a predetermined relationship with (e.g., greater than) the hit-miss threshold, then the cache hit-miss prediction 455 is a hit; otherwise, it is a miss. Other predetermined relationships may be used, such as greater than or equal, or any other predetermined value. Many variations are possible.

In one example, a confidence level of the determined prediction (e.g., prediction 455) is ascertained using tracker 424 of the selected entry. In one example, tracker 424 is a counter (e.g., a binary fraction counter) that is initialized to, e.g., 0 and increments (e.g., by 1) when a prediction is a correct prediction. The value of tracker 424 is compared to a confidence threshold (e.g., threshold 460). If, for instance, the value of tracker 424 has a predefined relationship 470 with (e.g., greater than or equal) a value of threshold 460 of the selected entry, then the determined prediction is used (e.g., prediction 455 is enabled, etc.). Otherwise, the determined prediction is not used (e.g., unenabled, bypassed, ignored). Other predefined relationships may be used, such as greater than, or any other predefined value. Many variations are possible.

Further details relating to predicting whether a memory access for a selected memory access instruction will result in a hit or miss in a cache (e.g., L1 cache) are described with reference to FIGS. 5-7. For instance, FIG. 5 depicts one example of further details of a predict/schedule module that may be used in predicting cache hit/misses and/or scheduling instructions based thereon, and FIGS. 6A, 6B and 7 depict examples of processing associated with predicting cache hits/misses.

Figure 5:
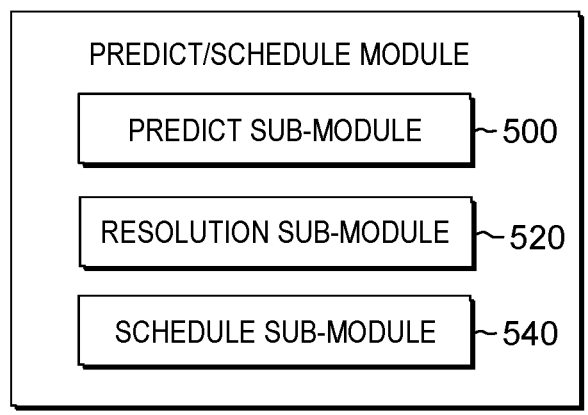
FIG. 5 depicts one example of sub-modules of a predict/schedule module of FIG. 2, in accordance with one or more aspects of the present disclosure.

Referring to FIG. 5, in one example, a predict/schedule module (e.g., predict/schedule module 290) includes logic (e.g., circuits, other logic, etc.), code and/or or instructions used to predict cache hit/misses, schedule instructions based thereon and/or perform other processing, in accordance with one or more aspects of the present disclosure. A predict/schedule module (e.g., predict/schedule module 290) includes, in one example, various sub-modules to be used to perform processing of one or more aspects of the present invention. The sub-modules are implemented, as examples, as logic and/or computer readable program code (e.g., instructions). Based on being implemented as logic, the logic is located, for instance, in a processor (e.g., processor 200), processing circuitry (e.g., processing circuitry 120), etc. Based on being implemented as computer readable program code, the computer readable program code is in, e.g., computer readable storage media, such as storage (e.g., cache 121, persistent storage 113, storage 124, other storage, as examples). The computer readable storage media may be part of one or more computer program products and the computer readable program code may be executed by and/or using one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 200) and/or other processor sets and/or other processors or nodes; processing circuitry, such as processing circuitry 120 of processor set 110 and/or other processors sets and/or other processing circuitry; and/or other computing devices, etc.). Additional and/or other computers, servers, devices, processors, nodes, processing circuitry and/or computing devices may be used to execute one or more of the sub-modules and/or portions thereof. Many examples are possible.

Referring to FIG. 5, in one example, predict/schedule module 290 includes a predict sub-module 500 to be used to predict a cache hit/miss; a resolution sub-module 520 to be used based on resolving a prediction; and a schedule sub-module 540 to be used in instruction execution scheduling. Predict/schedule module 290 may include additional, fewer and/or other sub-modules. Many variations are possible. Further, similar modules/sub-modules may be used for other selected purposes.

At least one of the sub-modules (e.g., sub-module 500) is used in a prediction process to predict cache hits/misses. In one example, referring to FIG. 6A, a prediction process (e.g., prediction process 600) is used to predict cache hits/misses, in accordance with one or more aspects of the present disclosure. Process 600 may be implemented and/or executed by and/or using one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 200) and/or other processor sets and/or other processors or nodes; processing circuitry, such as processing circuitry 120 of processor set 110 and/or other processors sets and/or other processing circuitry; and/or other computing devices, etc.). Additional and/or other computers, servers, devices, processors, nodes, processing circuitry and/or computing devices may be used to implement and/or execute the process and/or other aspects of the present disclosure. Many examples are possible.

Figure 6A:
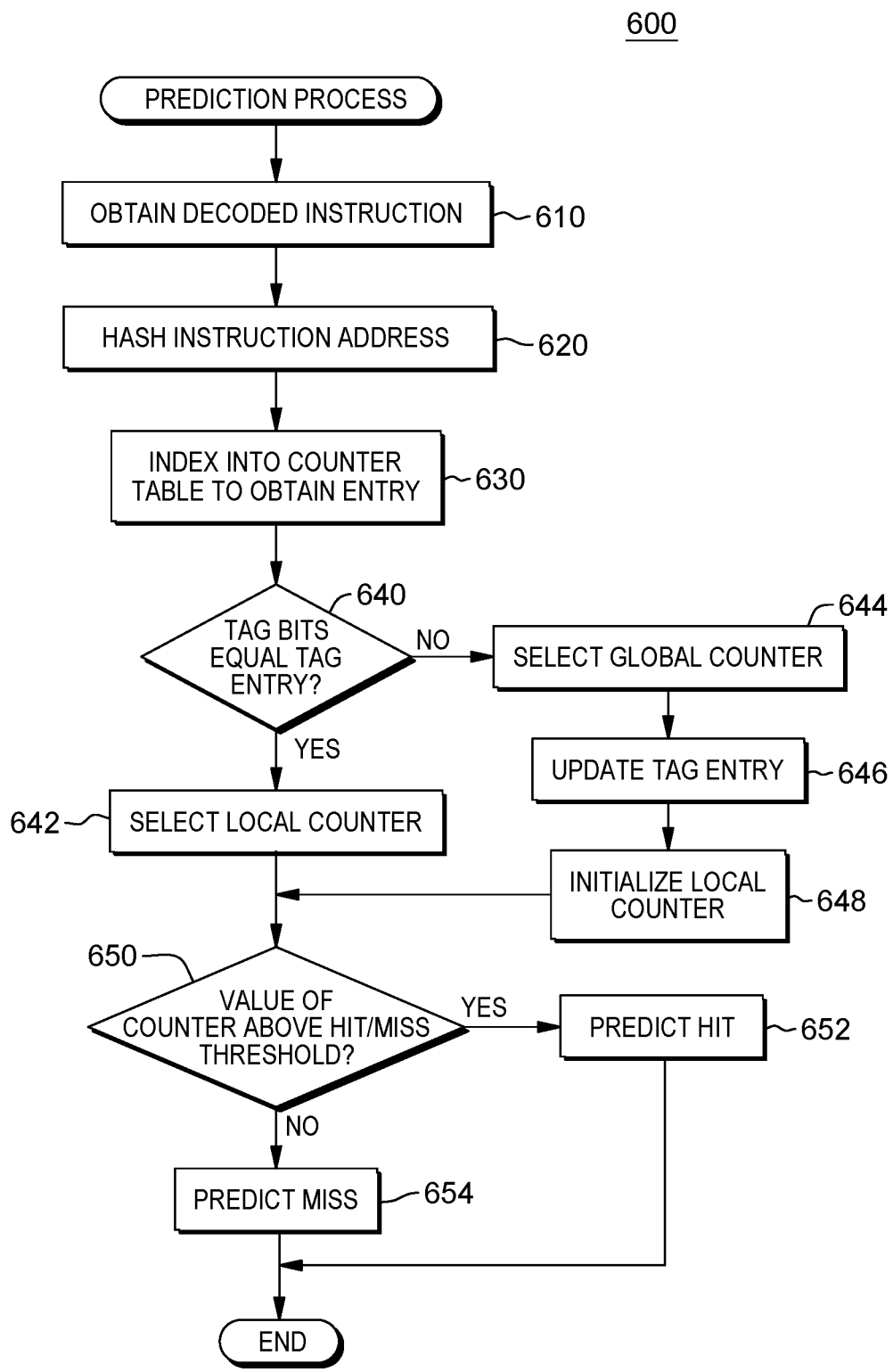
FIG. 6A depicts one example of a prediction process, in accordance with one or more aspects of the present disclosure.
Figure 7:
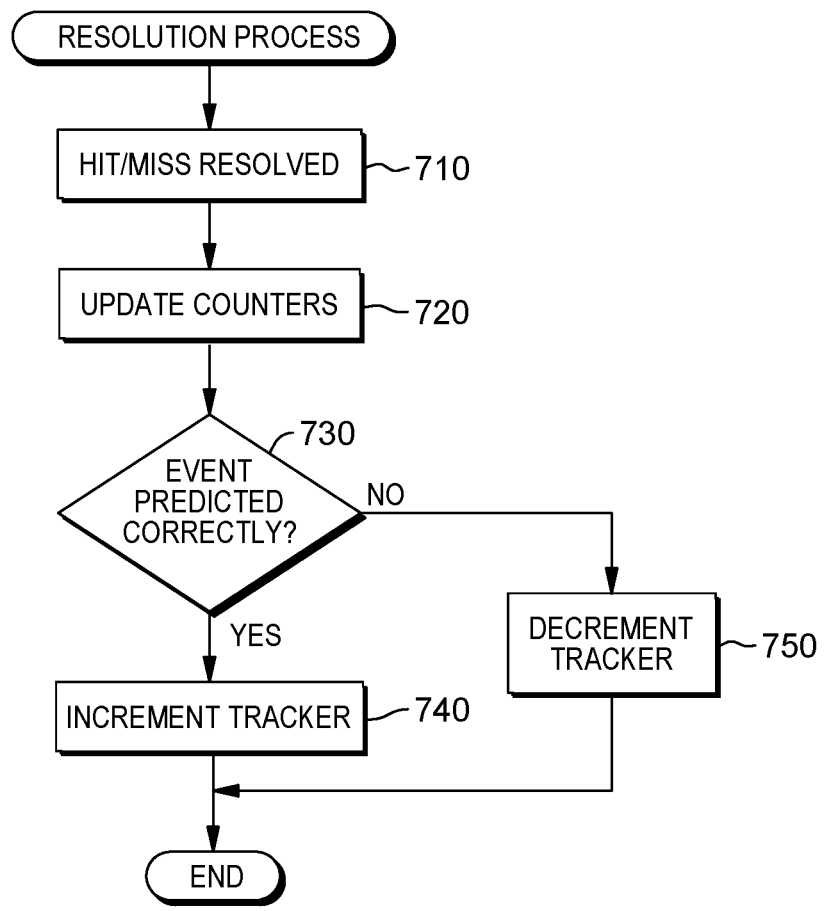
FIG. 7 depicts one example of a resolution process, in accordance with one or more aspects of the present disclosure.

Referring to FIG. 6A, in one example, prediction process 600 (also referred to herein as process 600) obtains 610 a decoded instruction and performs 620 a hash function on an instruction address (e.g., a virtual instruction address, a real instruction address, other address, etc.) of the decoded instruction to obtain a hash value. As an example, the decoded instruction is a memory access instruction, such as a load (store or other memory access) instruction. Process 600 uses the hash value to index 630 into a counter table (e.g., counter table 420) to obtain an entry (e.g., entry 421) of the counter table. Process 600 determines 640 whether tag bits of the instruction address are a match to tag bits of the selected entry (e.g., tag 422). If there is a match, in one example, process 600 selects 642 a local counter (e.g., counter 426) as a chosen counter. However, if there is no match, in one example, process 600 selects 644 a global counter (e.g., global counter 450) as the chosen counter. Further, in one example, based on the global counter being chosen, process 600 creates/updates 646 a tag entry of the counter table to reflect the instruction address and initializes 648 the local counter of the entry.

Moreover, in one example, process 600 determines 650 whether a value of the chosen counter has a predetermined relationship with (e.g., greater than) a selected value of a hit-miss threshold (e.g., 01 representing a weak miss, other selected values). Based on the value of the chosen counter having the predetermined relationship with the selected value of the hit-miss threshold, process 600 indicates 652 that the hit-miss prediction is a cache hit (e.g., prediction 455 is a cache hit). Further, based on the value of the chosen counter not having the predetermined relationship with the selected value of the hit-miss threshold, process 600 indicates 654 that the hit-miss prediction is a cache miss (e.g., prediction 455 is a cache miss).

Although an example predetermined relationship is provided, one or more other predetermined relationships may be used. Further, other selected values may be used. Many variations are possible.

In one or more aspects, the determined prediction is used based on a certain confidence level of the determined prediction. Therefore, in accordance with one or more aspects, a confidence process is used to determine the confidence of the determined prediction. At least one of the sub-modules (e.g., sub-module 500) is used in a confidence process to determine the confidence of the determined prediction. In one example, the confidence process is used based on the local counter being chosen. However, in other embodiments, the confidence process may be used regardless of the chosen counter. If the confidence process is used for the global counter, in one example, a tracker value is assumed for the global counter and that value is assumed, in one example, to have the predefined relationship with the confidence threshold (i.e., the prediction based on the global counter is enabled). Other examples and variations are possible.

Figure 6B:
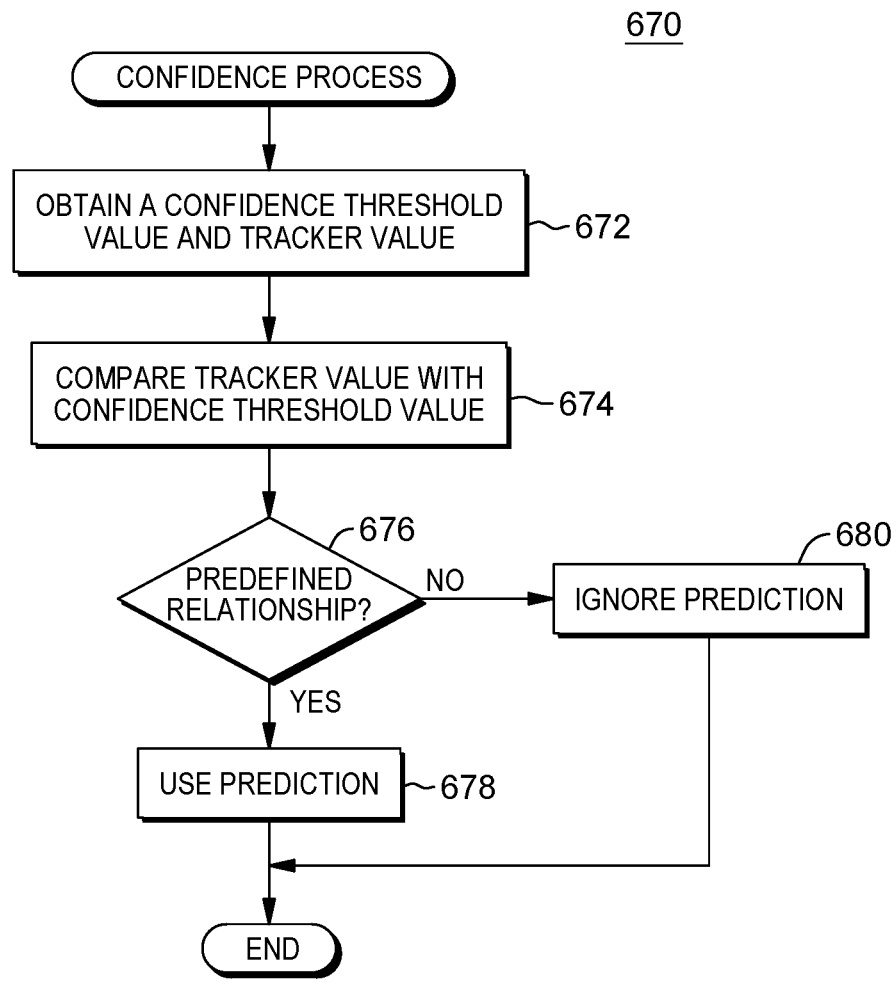
FIG. 6B depicts one example of a confidence process, in accordance with one or more aspects of the present disclosure.

In one example, referring to FIG. 6B, a confidence process (e.g., confidence process 670) is used to determine whether the determined prediction is to be used in instruction execution scheduling, in accordance with one or more aspects of the present disclosure. Process 670 may be implemented and/or executed by and/or using one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 200) and/or other processor sets and/or other processors or nodes; processing circuitry, such as processing circuitry 120 of processor set 110 and/or other processors sets and/or other processing circuitry; and/or other computing devices, etc.). Additional and/or other computers, servers, devices, processors, nodes, processing circuitry and/or computing devices may be used to execute the process and/or other aspects of the present disclosure. Many examples are possible.

Referring to FIG. 6B, in one example, confidence process 670 (also referred to herein as process 670) obtains 672 a confidence threshold value and a tracker value. In one example, the tracker value is provided by a tracker (e.g., tracker 424), which is, e.g., a binary fraction counter (however, other types of counters and trackers may be used). The tracker value is obtained from the selected counter table entry (e.g., the entry corresponding to the memory access instruction). Process 670 compares 674 the tracker value with the confidence threshold value and determines 676 whether the tracker value (e.g., tracker 424) has a predefined relationship with (e.g., greater than or equal) the confidence threshold value (e.g., threshold 460). Based on the tracker value (e.g., tracker 424) having the predefined relationship 470 with (e.g., greater than or equal) the confidence threshold value (e.g., threshold 460), process 670 indicates that the determined prediction is to be is to be used 678 (e.g., prediction 455 is enabled); otherwise, process 670 indicates that the determined prediction is to be ignored 680 (e.g., prediction 455 is unenabled). Again, the predefined relationship may be other than greater than or equal. Many variations are possible.

Further details relating to processing when a cache hit/miss is resolved are described with reference to FIG. 7. In one example, a resolution process (e.g., resolution process 700) is based on a cache hit or miss being resolved, in accordance with one or more aspects of the present disclosure. Process 700 may use one or more of the sub-modules (e.g., sub-module 520) of predict/schedule module 290 and may be implemented and/or executed by and/or using one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 200) and/or other processor sets and/or other processors or nodes; processing circuitry, such as processing circuitry 120 of processor set 110 and/or other processors sets and/or other processing circuitry; and/or other computing devices, etc.). Additional and/or other computers, servers, devices, processors, nodes, processing circuitry and/or computing devices may be used to execute the process and/or other aspects of the present disclosure. Many examples are possible.

Referring to FIG. 7, in one example, resolution process 700 (also referred to herein as process 700) determines 710 that a cache hit/miss has been resolved. Based thereon, resolution process 700 updates 720 the local and global counters. For instance, the counters are updated to indicate a strong miss, a weak miss, a weak hit or a strong hit. Additional, fewer and/or other levels may also be used.

In one example, the local counters and/or the global counter are saturating counters. For instance, one or more of the counters are 2-bit saturating counters. However, in other examples, they may be more or less than 2 bits; many examples are possible. One example of counter values is described below. Hits and misses tend to be temporarily clustered. In one example:

|    | Prediction            | Counter Value |
|----|-----------------------|---------------|
| 1. | Predict Miss (strong) | 00            |
| 2. | Resolves Miss         | 00            |
| 3. | Predict Miss (strong) | 00            |
| 4. | Resolves Hit          | 01            |
| 5. | Predict Miss (weak)   | 01            |
| 6. | Resolves Hit          | 10            |

| | Prediction | Counter Value |
|---|---|---|
| 7. | Predict Hit (weak) | 10 |
| 8. | Resolves Hit | 11 |
| 9. | Predict Hit (strong) | 11 |

Again, other levels of hit/miss may be indicated, as well as other values. Many examples are possible.

Further, in one example, resolution process 700 determines 730 whether the event predicted correctly. For instance, if the predictor (e.g., predictor 270) accurately predicted a hit or a miss, then resolution process 700 updates (e.g., increments 740, e.g., by 1) the appropriate tracker (e.g., tracker 424 of the entry corresponding to the instruction), and resolution processing is complete. Otherwise, if the predictor did not accurately predict a hit or a miss, then, in one example, the tracker is updated by, e.g., decrementing 750 the tracker, e.g., by 1, and resolution processing is complete.

In one or more aspects, a cache hit/miss predictor is used to predict cache hit/misses. In one or more aspects, the hit/miss predictor (e.g., hit/miss predictor 270) is accessed at decode and the prediction is used to give a priority to the instruction (e.g., load instruction). The prediction travels with the instruction and the prediction is used again to issue dependent instructions of the load instruction. In another embodiment, the hit/miss predictor (e.g., hit/miss predictor 270) is accessed at decode and the prediction is used to give a priority to the instruction (e.g., load instruction). Then, the hit/miss predictor (e.g., hit/miss predictor 270) is accessed again at issue of the load (e.g., at issue time, such as at or about the time of issue) and the prediction is used to issue dependent instructions of the load instruction and/or to prioritize execution of load instructions (or other memory access instructions).

In one or more aspects, to update the counter table (e.g., counter table 420), the prediction information (e.g., table index and prediction) is piped with the load, and the information is used to update the global counter (e.g., counter 450), the local counter (e.g., counter 426) and/or the tracker (e.g., tracker 424). Other examples are possible.

In one or more aspects, if there was an actual hit when the prediction was a miss (determined based on comparing the prediction with the actual cache result), then the dependent instructions are woken up.

In one or more aspects, miss predictions are leveraged to hold dependent instructions and to give higher priority to loads that are predicted to miss. Further, in one or more aspects, a cache hit/miss predictor includes a tracker to capture specific accesses that are hard to predict. The cache hit/miss predictor, in one example, includes a tag bits (total/partial) entry that defaults to global history on initialization, and the entry includes an n-bit saturating counter indexed by, e.g., a hashed virtual instruction address.

In one or more aspects, a hit/miss predictor (e.g., hit/miss predictor 270) is used to predict data cache accesses, as well as instruction cache accesses. In one or more aspects, the cache hit/miss predictor uses an instruction global counter for instruction accesses. In one example, the output of multiplexer 440 (FIG. 4) is input to another multiplexer, which also receives as input, an output of the instruction global counter. Further, the select control of the other multiplexer is a data access control in which if it is a data access, the output of multiplexer 440 is selected; otherwise, if it is an instruction access, the output of the instruction global counter is selected. Many variations are possible.

In one or more aspects, intelligent instruction scheduling is provided using a cache hit/miss predictor. The predictor/prediction may be used at decode time and/or issue time after dependencies are resolved. In one or more aspects, if the prediction is a cache miss prediction, dependent instructions are not issued, and therefore, they do not need to be rescinded, saving power and time and allowing other instructions to issue. Further, using one or more aspects, long latency misses may be scheduled rather than the oldest load. That is, in one example, priority is given to loads that are predicted to miss. Other examples are possible.

In one example, a scheduler (e.g., scheduler 280) is used in scheduling instruction execution. The scheduler may use a schedule sub-module (e.g., schedule sub-module 540) to implement and/or execute the scheduling processing.

The computing environments described herein are only examples of computing environments that can be used. One or more aspects of the present disclosure may be used with many types of environments. The computing environments provided herein are only examples. Each computing environment is capable of being configured to include one or more aspects of the present disclosure. For instance, each may be configured to implement and/or perform prediction and/or scheduling and/or to implement and/or perform one or more other aspects of the present disclosure.

One or more aspects of the present disclosure are tied to computer technology and enhance processing within a computer, improving performance thereof. For instance, performance is improved by predicting cache misses and taking action based thereon (e.g., holding dependent instructions/giving priority to miss predicted loads). Performance of computer systems with memory hierarchies and a pipelined architecture is increased. Processing within a processor, computer system and/or computing environment is improved.

Other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

Yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other memory access instructions may be used. Further, other predictors may be used, including, but not limited to, other examples of a counter table and/or a global counter. Many variations are possible.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing within a computing environment, the computer-implemented method comprising:
    determining a cache hit-miss prediction for a memory access instruction, the determining using a predictor, the predictor comprising a tracker for the memory access instruction, the tracker to be used to provide a prediction confidence level of the cache hit-miss prediction for the memory access instruction;
    ascertaining, using the tracker, the prediction confidence level of the cache hit-miss prediction; and
    providing the cache hit-miss prediction to be used in instruction execution scheduling, based on the prediction confidence level indicating the cache hit-miss prediction is to be used.

2. The computer-implemented method of claim 1, wherein the ascertaining, using the tracker, the prediction confidence level of the cache hit-miss prediction includes:
    comparing a value of the tracker with a confidence threshold; and
    setting the prediction confidence level to indicate the cache hit-miss prediction is to be used, based on the comparing indicating that the value of the tracker has a predefined relationship with the confidence threshold.

3. The computer-implemented method of claim 1, wherein the determining the cache hit-miss prediction for the memory access instruction includes:
    obtaining a value of a counter;
    comparing the value of the counter to a hit-miss threshold;
    determining the cache hit-miss prediction, based on a comparison of the value of the counter with the hit-miss threshold.

4. The computer-implemented method of claim 3, wherein based on the value of the counter having a predetermined relationship with the hit-miss threshold, the cache hit-miss predication is a cache hit.

5. The computer-implemented method of claim 4, wherein based on the value of the counter not having the predetermined relationship with the hit-miss threshold, the cache hit-miss predication is a cache miss.

6. The computer-implemented method of claim 3, wherein the counter is an n-bit saturating counter for the memory access instruction, the n-bit saturating counter indexed in the predictor by a hashed instruction address of the memory access instruction.

7. The computer-implemented method of claim 1, wherein the determining the cache hit-miss prediction for the memory access instruction comprises:
    using at least part of an instruction address of the memory access instruction to index into a counter table of the predictor to select an entry of the counter table;
    checking tag bits of the entry of the counter table; and
    based on the at least part of the instruction address matching the tag bits of the entry of the counter table, obtaining a value of a counter of the entry of the counter table, the value of the counter used in determining the cache hit-miss prediction.

8. The computer-implemented method of claim 1, further comprising performing instruction execution scheduling based on the cache hit-miss prediction, wherein execution of one or more dependent instructions of the memory access instruction is suppressed based on the cache hit-miss prediction predicting a cache miss.

9. The computer-implemented method of claim 1, further comprising performing instruction execution scheduling based on the cache hit-miss prediction, wherein the performing instruction execution scheduling includes selecting the memory access instruction from a plurality of memory access instructions to be scheduled, based on the cache hit-miss prediction predicting a cache miss, wherein the memory access instruction is given scheduling priority over the plurality of memory access instructions based on the cache hit-miss prediction predicting the cache miss.

10. The computer-implemented method of claim 1, further comprising determining the cache hit-miss prediction for another memory access instruction, wherein the determining the cache hit-miss prediction for the another memory access instruction comprises:
    using at least part of an instruction address of the another memory access instruction to index into a counter table of the predictor to select an entry of the counter table;
    checking tag bits of the entry of the counter table; and
    based on the at least part of the instruction address not matching the tag bits of the entry of the counter table, using a global counter of the predictor to determine the cache hit-miss prediction for the another memory access instruction.

11. The computer-implemented method of claim 1, wherein the memory access instruction is a load instruction.

12. A computer system for facilitating processing within a computing environment, the computer system comprising:
    a processor; and
    a predictor of the processor, the predictor to perform the following computer operations including:

determining a cache hit-miss prediction for a memory access instruction, the determining using the predictor, the predictor comprising a tracker for the memory access instruction, the tracker to be used to provide a prediction confidence level of the cache hit-miss prediction for the memory access instruction;

ascertaining, using the tracker, the prediction confidence level of the cache hit-miss prediction; and providing the cache hit-miss prediction to be used in instruction execution scheduling, based on the prediction confidence level indicating the cache hit-miss prediction is to be used.

13. The computer system of claim 12, wherein the ascertaining, using the tracker, the prediction confidence level of the cache hit-miss prediction includes:

comparing a value of the tracker with a confidence threshold; and setting the prediction confidence level to indicate the cache hit-miss prediction is to be used, based on the comparing indicating that the value of the tracker has a predefined relationship with the confidence threshold.

14. The computer system of claim 12, wherein the determining the cache hit-miss prediction for the memory access instruction includes:

obtaining a value of a counter;

comparing the value of the counter to a hit-miss threshold;

determining the cache hit-miss prediction, based on a comparison of the value of the counter with the hit-miss threshold.

15. The computer system of claim 12, wherein the determining the cache hit-miss prediction for the memory access instruction comprises:

using at least part of an instruction address of the memory access instruction to index into a counter table of the predictor to select an entry of the counter table;

checking tag bits of the entry of the counter table; and based on the at least part of the instruction address matching the tag bits of the entry of the counter table, obtaining a value of a counter of the entry of the counter table, the value of the counter used in determining the cache hit-miss prediction.

16. The computer system of claim 12, wherein the computer operations further comprise determining the cache hit-miss prediction for another memory access instruction, wherein the determining the cache hit-miss prediction for the another memory access instruction comprises:

using at least part of an instruction address of the another memory access instruction to index into a counter table of the predictor to select an entry of the counter table;

checking tag bits of the entry of the counter table; and based on the at least part of the instruction address not matching the tag bits of the entry of the counter table, using a global counter of the predictor to determine the cache hit-miss prediction for the another memory access instruction.

17. A computer program product for facilitating processing within a computing environment, the computer program product comprising:

a set of one or more computer readable storage media; and program instructions, collectively stored in the set of one or more computer readable storage media, for causing at least one computing device to perform the following computer operations including:

determining a cache hit-miss prediction for a memory access instruction, the determining using a predictor, the predictor comprising a tracker for the memory access instruction, the tracker to be used to provide a prediction confidence level of the cache hit-miss prediction for the memory access instruction;

ascertaining, using the tracker, the prediction confidence level of the cache hit-miss prediction; and providing the cache hit-miss prediction to be used in instruction execution scheduling, based on the prediction confidence level indicating the cache hit-miss prediction is to be used.

18. The computer program product of claim 17, wherein the ascertaining, using the tracker, the prediction confidence level of the cache hit-miss prediction includes:

comparing a value of the tracker with a confidence threshold; and setting the prediction confidence level to indicate the cache hit-miss prediction is to be used, based on the comparing indicating that the value of the tracker has a predefined relationship with the confidence threshold.

19. The computer program product of claim 17, wherein the determining the cache hit-miss prediction for the memory access instruction includes:

obtaining a value of a counter;

comparing the value of the counter to a hit-miss threshold;

determining the cache hit-miss prediction, based on a comparison of the value of the counter with the hit-miss threshold.

20. The computer program product of claim 17, wherein the determining the cache hit-miss prediction for the memory access instruction comprises:

using at least part of an instruction address of the memory access instruction to index into a counter table of the predictor to select an entry of the counter table;

checking tag bits of the entry of the counter table; and based on the at least part of the instruction address matching the tag bits of the entry of the counter table, obtaining a value of a counter of the entry of the counter table, the value of the counter used in determining the cache hit-miss prediction.

* * * * *